Jan. 21, 1936. C. T. WALTER Re. 19,830

SLICING MACHINE

Original Filed Oct. 21, 1932 4 Sheets-Sheet 1

Charles T. Walter
INVENTOR

WITNESS
Wm. C. Meiser

BY Geo. W. Johns
ATTORNEY

Jan. 21, 1936. C. T. WALTER Re. 19,830

SLICING MACHINE

Original Filed Oct. 21, 1932 4 Sheets-Sheet 2

Charles T. Walter
INVENTOR

BY Fred W. Johns
ATTORNEY

WITNESS
Wm C. Meiser

Jan. 21, 1936. C. T. WALTER Re. 19,830

SLICING MACHINE

Original Filed Oct. 21, 1932 4 Sheets-Sheet 3

Charles T. Walter

INVENTOR

WITNESS

Wm C. Meiser

BY Tony W. Johns

ATTORNEY

Jan. 21, 1936. C. T. WALTER Re. 19,830

SLICING MACHINE

Original Filed Oct. 21, 1932 4 Sheets-Sheet 4

WITNESS
Wm C. Meiser

Charles T. Walter
INVENTOR

BY Stony W. Johns
ATTORNEY

Reissued Jan. 21, 1936 Re. 19,830

UNITED STATES PATENT OFFICE 19,830

SLICING MACHINE

Charles T. Walter, Chicago, Ill., assignor to Industrial Patents Corporation, Chicago, Ill., a corporation of Delaware Original No. 1,942,991, dated January 9, 1934, Serial No. 638,945, October 21, 1932. Application for reissue June 5, 1935, Serial No. 25,188

13 Claims. (Cl. 146—155)

The present invention relates to meat slicing machines and particularly to such that are useful in the cutting of slabs of bacon into slices.

It furthermore relates to that type of machine in which bacon is fed along a forward longitudinal path to a continuously moving or operating knife or cutter—namely, a continuously reciprocating or a continuously rotating knife or cutter—that operates in a cutting plane which extends transversely in respect to the line of feed and from which the slices of bacon are preferably delivered to the upper lobe or strand of a continuously moving endless conveyor. The conveyor receives the slices as delivered from the cutting machine and conducts them away from the same and preferably the slices are delivered to the conveyor in such a manner that they become assembled on the conveyor in spaced group arrangement with the slices in each group assembled and arranged in a relative uniform manner in respect to each other.

Another object of the present invention is to construct a machine which can be employed with the continuously moving conveyor in a manner to allow the continued operating or reciprocating movements of the knife or cutter but which machine is constructed so that the bacon slabs are progressively fed in a uniform manner to the knife during a certain period or for a certain number of operating or reciprocating movements of the knife and so that for a certain succeeding period or for a certain number of reciprocating movements of the knife or cutter the slab of bacon is maintained in a retracted position in respect to the knife or cutter, whereby, as the slicing machine thus normally functions in the manner outlined there will be delivered therefrom to the endless conveyor the slices in a manner to effect the spaced group arrangement and slice assembly desired.

The slicing machine is a power-operated machine and is constructed so that it has a main frame in respect to which slabs of bacon to be cut are fed in a longitudinally extending forward direction, but so that it also has a reciprocating cutter or knife that performs the cutting operation by movement in a transversely extending cutting plane that extends substantially at right angles to the line of bacon slab feed, and one object of the invention is to provide or construct such a machine so that it has a bacon slab feeding mechanism which is operated from the same source of power that operates the knife and which is constructed so as to feed the bacon slabs to and under the cutting influence of the knife during a period when the bacon slab feeding mechanism as a whole is being moved forwardly on and relative to the main frame of the machine, that is forwardly towards the knife but which feeding mechanism is constructed so that as a whole it can be moved rearwardly and relative to the main frame, that is, from or in retracted position in respect to the knife so as to cause a cessation for a certain limited number of knife reciprocations of the actual slab slicing or cutting operations.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

Reference will now be made to the drawings constituting a part of this specification and in which drawings:—

Fig. 1 is a vertical side elevation of a bacon slicing machine. In this machine there is shown the usual main frame upon which frame there is provided means whereby slabs of bacon are supported and fed in a general longitudinal forward direction towards a cutter that operates in a transversely extending cutting plane. The machine of this figure shows means for reciprocating the cutter in said transversely extending cutting plane and also a receiving table in the form of an endless conveyor that is arranged to receive the slices of bacon as delivered thereto as the result of the cutting operation. It is desirable to deliver the slices to the endless conveyor so that it will be assembled in spaced group arrangement. The endless conveyor preferably operates in a continuous uninterrupted manner, and the main feature of the present invention revolves about the employment of a positionable main feeding means which is movably mounted upon the main frame of the machine. This main feeding means is driven from the motor that operates the cutter in such a manner that for a certain number of cutting operations the main feed frame has a general forward movement and for a succeeding certain number of cutter reciprocations the main feed frame is moved rearwardly or is given a retracted position. In the slicing machine shown there is also provided on the main feed frame what may be termed auxiliary feeding members which are arranged to progressively feed slabs of bacon in a forward longitudinal direction in reference to the positionable main frame. In this figure there is shown the arrangement of operative connections whereby the several movements just referred to are enabled to be accomplished.

Figure 1:
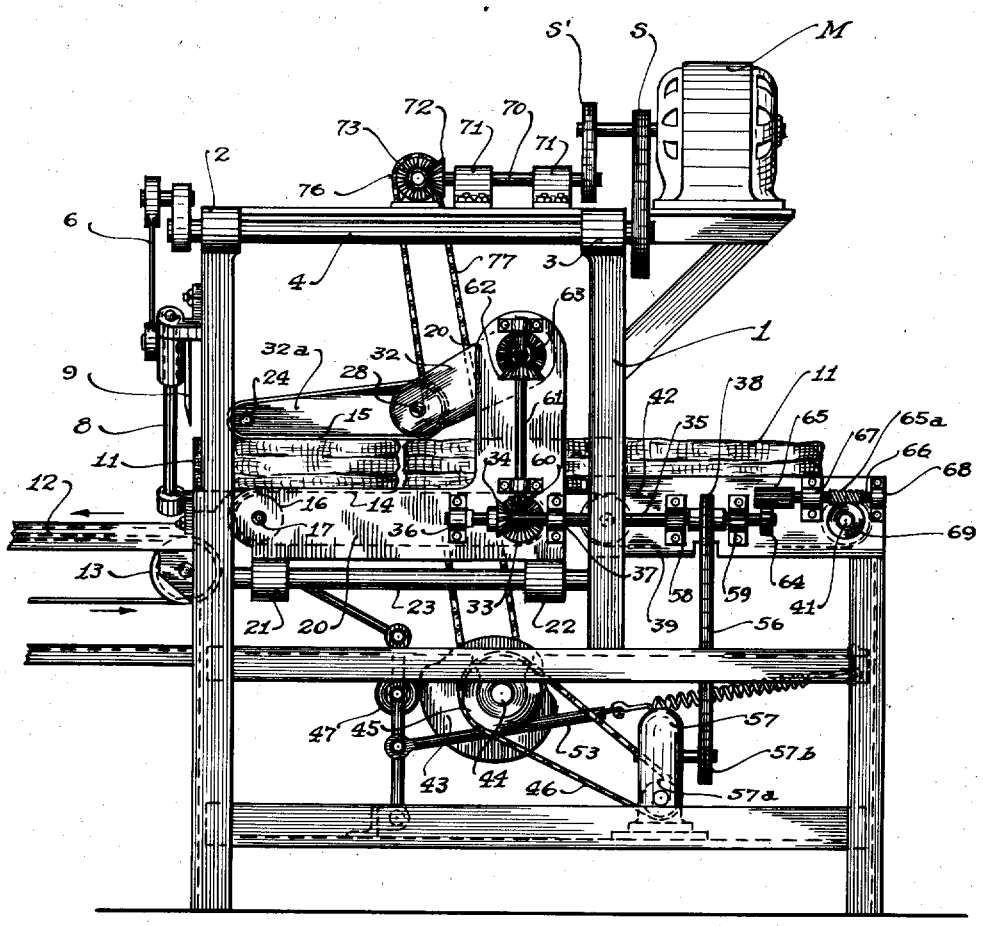
Figure 2:
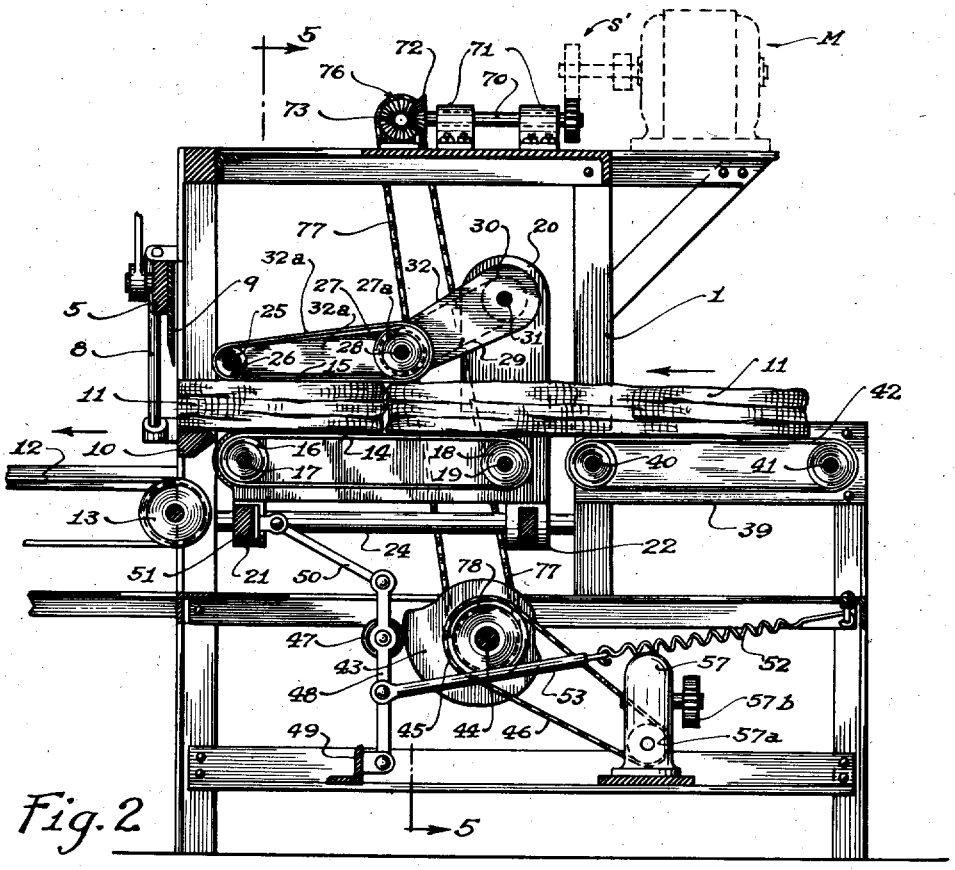
Fig. 2 is a vertical, longitudinally extending sectional view of the slicing machine shown in Fig. 1.
Figure 3:
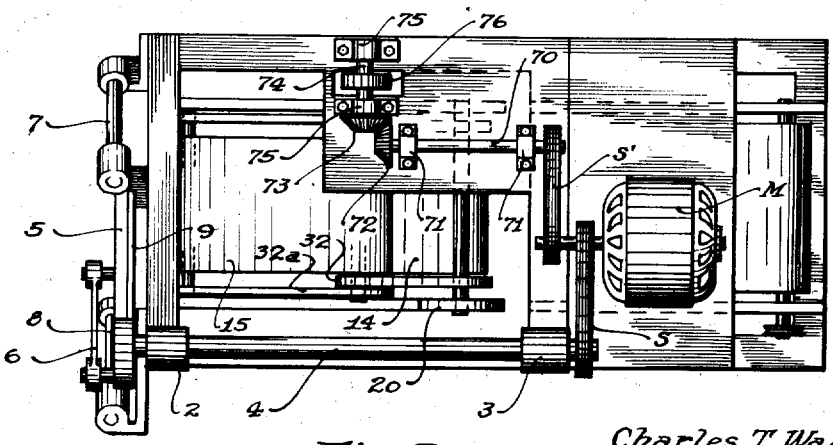
Fig. 3 is a plan view of the slicing machine shown in Figs. 1 and 2.
Figure 4:
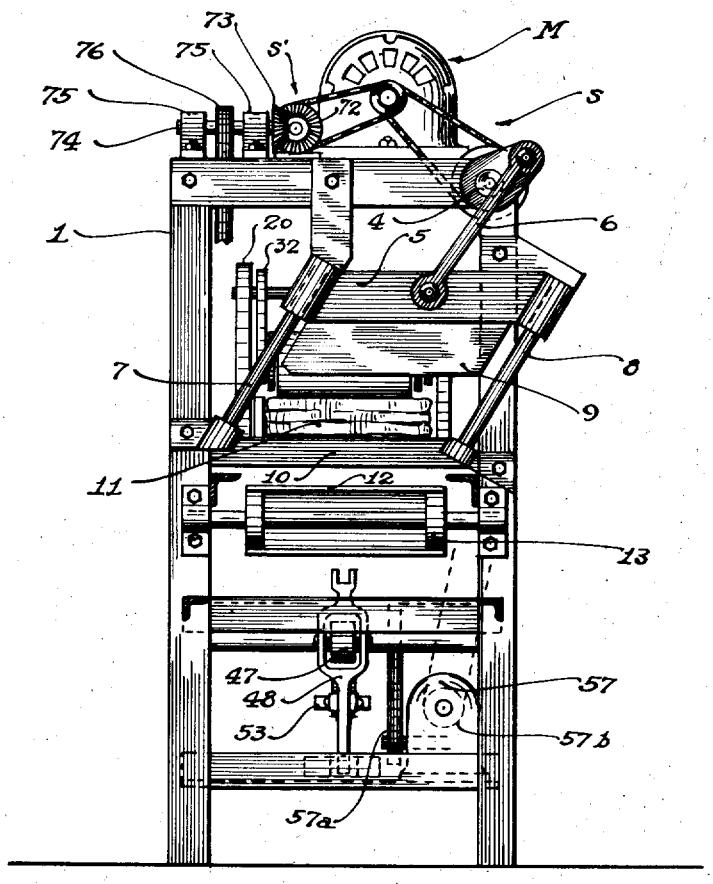
Fig. 4 is a front elevation, or in other words, is a vertical end view looking at the slicing machine towards the cutter or delivery end thereof.
Figure 5:
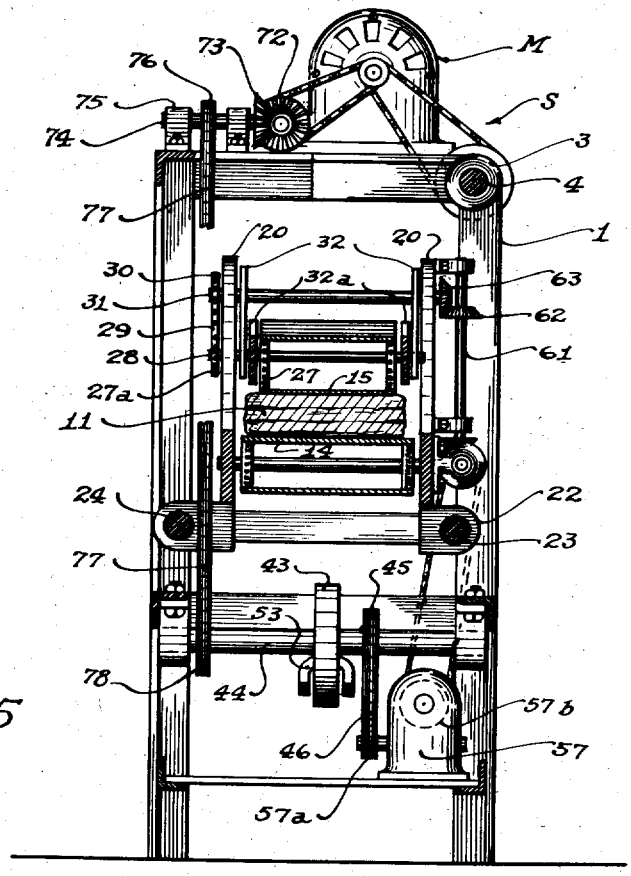
Fig. 5 is a vertical, transverse, sectional view taken as on the planes indicated by the broken line 5—5 of Fig. 2, looking in the direction of the arrows.

Reference will now be made to the drawings in detail. In said drawings, 1 represents a main frame of the machine to which the various machine elements are attached and by which they are supported. 2 and 3 designate bearings in which there is supported the longitudinally extending main or crank shaft 4 which drives or reciprocates the knife carrier or carriage 5 through connecting rod or other suitable driving mechanism as 6. The knife carriage or cutter carrier 5 slides on suitable guides 7 and 8 which are shown as inclined guide members, and the knife of cutter 9 is rigidly attached to the frame of the knife carrier 5.

A fixed member as 10 serves as an anvil upon which the bacon slab as 11 is supported and against which it is pressed during the cutting or slicing operation. A conveyor 12, which is in fact an endless continuously operating conveyor, may be of any suitable type such as is provided by multiple chains or cords and runs over sprockets or pulleys 13. This chain or endless conveyor moves at a constant speed in the direction indicated by the arrow, and the purpose of this conveyor is to receive the slices and to carry away the sliced bacon received thereupon. The bacon slab as 11 is firmly held between conveyor or auxiliary chains 14 and 15 which constitute an important part of what is sometimes herein referred to as the secondary or auxiliary feeding mechanism. These chains 14 and 15, as will hereinafter more prominently appear, are supported or connected either directly or indirectly to a movable main frame or framework 20 of a main feeding member and which movable main frame can be positioned towards the cutter and retracted from the cutter by mechanism which will be more fully explained hereinafter. The conveyor chain 14 is supported at its forward end by a suitable sprocket 16 mounted on shaft 17. At its opposite end the conveyor chain is supported by a sprocket 18 mounted on shaft 19. These two shafts 17 and 19 are in turn mounted on the rigid but movable framework 20 heretofore mentioned. This framework or movable frame 20 is provided with suitable bosses such as 21 and 22 which are slidably mounted on parallel guides 23 and 24.

By virtue of this mounting conveyor element 14 can, in effect, move back and forth along and in respect to guides 23 and 24 parallel to itself. Also attached to the sliding frame 20 is the conveyor element 15 or auxiliary feeding member previously referred to. This conveyor element or auxiliary feeding element 15 is supported at one end by suitable sprockets 25 mounted on shaft 26 and at its other end by sprockets 27 mounted on shafts 28. The driving chain 29 represents a suitable endless element which serves as means for driving sprocket 27[a] on shaft 28. This endless chain 29 also passes over sprocket 30 mounted on shaft 31 which is rotatably mounted on frame 20, the framework which comprehends the sections 32 and 32[a] at each side of the chain elements serves to keep shafts 26, 28 and 31 in proper relationship to each other. Shafts 19 and 31 should receive their driving power from the same source and must be driven so as to give the same linear conveyor speed to the conveyors or auxiliary feeding means 14 and 15 and their direction of rotation should be such that the top strand of the conveyor 14 and the bottom strand of the conveyor 15 move in the same direction at the same speed. The shaft 19 is driven through a pair of bevel gears 33 and 34, the former of which is mounted on shaft 19 and the latter of which is mounted on shaft 35 which is supported by bearings 36 and 37 which are rigidly attached to the frame 20. The shaft 35 is slidably and rotatably mounted in bearings 58 and 59, and is slidably mounted in conjunction with a sprocket wheel 38 through the medium of suitable keys.

The bearings 58 and 59 are on a fixed or stationary section of the frame and consequently this sliding of the shaft 35 in the bearings 58 and 59 and also in respect to the gear or sprocket wheel 38 must be provided to allow for the forward and rearward movement of the frame 20. Through the medium of this mechanism the conveyor shaft 19 can receive a continuous driving force as it, in effect, slides back and forth along the guides 23 and 24 because of the movement imparted to the carriage 20. The driving between the shafts 19 and 31 is clearly shown in Fig. 1 and comprehends the following mechanism. A bevel gear 34 engages and drives a bevel gear 33 which in turn drives the shaft 61 through gear 60. Bevel gear 62 in turn drives bevel gear 63, thence shaft 31 and the train of mechanism previously described with the result that the adjacent cooperating strands of the conveyor members 14 and 15 continuously travel in the same general forward direction.

Bearings 58 and 59 as previously indicated, are rigidly attached to the fixed frame 39 which frame in turn also supports shafts 40 and 41 which in turn carry an auxiliary feeding or endless conveyor means 42. The purpose of this auxiliary conveyor is to carry bacon slabs into the region of the auxiliary feed conveyors 14 and 15. Fig. 1 shows that this endless conveyor 42 and more particularly the shaft 41 thereof, is driven from the shaft 35 through the medium of a spur gear 64 which has sliding engagement with a spur gear 65 which is mounted on a shaft 66 that is carried in bearings 67 and 68 on the fixed framework.

The shaft 66 operates the worm 65[a] which in turn meshes with and operates worm wheel 69 that is on the shaft 41 with the result that the continued rotative movement of the shaft 35 effects a corresponding continued rotating movement of the shaft 44 that operates the endless feeding end conveyor 42.

The auxiliary feed conveyor 15 is designed and constructed to apply a vertical pressure to the bacon slabs thereby preventing the shifting or moving of the bacon slabs in relation to the conveying elements 14 and 15 when the bacon slab is in place between them. The movable frame or carriage member 20 is moved back and forth along its guides under the action of the cam 43 which is mounted on shaft 44 and which is driven at a uniform velocity by any suitable means as sprocket wheels 45 and chain 46. Anti-friction roller 47 rides on cam 43. This roller is rotatably mounted on lever arm 48 which is pivoted at one end to a fixed member 49. The other end of this lever is pivotally connected to rod 50 by which the lever is connected to a suitable cross member 51 rigidly attached to the carriage or movable frame 20. This movable frame 20 because of the holding effect of the auxiliary feed members thereupon may be considered as the main feeding member because the main control of the bacon slabs to and from cutting position is under the immediate control of this main frame member 20. A spring 52 acts through yoke or connecting link 53 to thereby cause the roller 47 to maintain contact with the cam 43 at all times.

An inspection of Fig. 1 makes it clear that the mechanism just described is completely driven from the motor M that is mounted on the main frame. This motor M through the medium of chain and spur gearing indicated by S serves to operate the crank or main shaft 4 previously referred to. From this same motor and through the medium of a second chain and spur gearing as S' there is provided means whereby from the same motor the shaft 44 can be driven, for example, through the shaft 70 that is supported in bearings 71 on the main frame. This shaft 70 drives bevel gears 72 and 73, shaft 74 in bearings 75 as clearly shown in Figs. 1, 2, 4 and 5. Shaft 74 in turn drives a gear 76, chain 77, and gear 78 that is on the shaft 44 which drives the cam 43. It will be noted that the endless chain 46 driven from the gear 45 operates to turn a gear 57[a] which is part of a speed reducing mechanism 57 and that this speed reducing mechanism 57 comprehends a sprocket 57[b] which in turn operates the chain 56 and therethrough the sprocket gear 38 and the shaft 35 previously described. In this manner all the operative parts of the slicing machine are driven from the motor that is mounted at the top of the machine.

Figure 6:
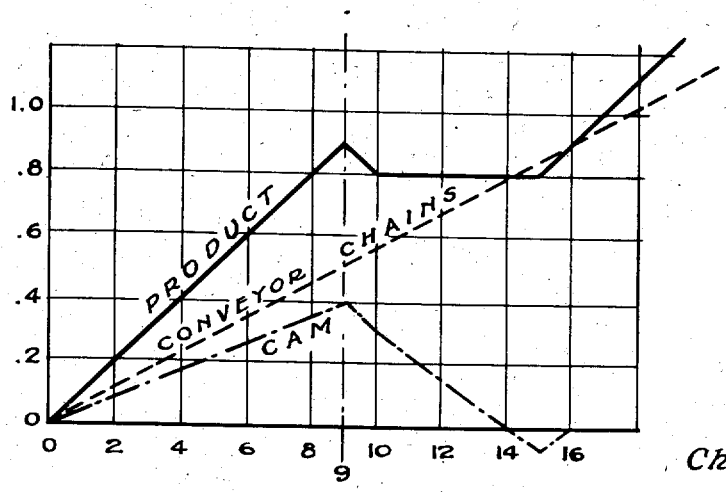
Fig. 6 is a diagrammatic view showing the relationship between the motion of the several functional parts of the machine.

If one will now refer to Fig. 6 and bear in mind the construction previously described, he will be able to realize that during the slicing portion of the cycle that the product or slabs of bacon are fed to the knife at a uniform rate of speed so as to obtain slices of uniform thickness. This is shown or indicated by the straight line in Fig. 6 marked product. This motion is brought about by a continuous and uniform motion of the conveyor chains plus a forward motion brought about by the action of the cam 43 on the main frame 20.

These are all straight line motions and are clearly indicated in Fig. 6. At the time the last slice of a given group is delivered to the receiving and delivering conveyor 12 it is desired to slightly withdraw the bacon slabs from the cutting plane or cutting zone of the knife and hold the slabs of bacon in retracted or withdrawn required position for a period of time during which the endless receiving and delivering conveyor 12 continues to move and thus form adjacent groups of slices. In fact, this main feed frame 20 is held in the retracted or required position for a certain number of knife reciprocations. At the end of this predetermined time or in other words, at the end of a certain number of knife reciprocations, it is desired to again advance the bacon in the cutting plane of the knife and repeat the cycle.

Fig. 6 indicates how this is brought about by the positive and negative displacements of the movable main feeding frame 20 under the influence of the cam 43. As previously indicated, applicant has pointed out how from the common source the several parts of the machine are operated such as the main drive shaft that operates the cutter and the cam shaft 44 that controls the positioning of the movable main feed frame 20 and the drive shaft 35 that is relied upon to operate some of the endless conveying and feeding elements with which the machine is provided.

What is claimed is:

1. In a bacon slicing machine, a main frame, a reciprocating cutter carrying mechanism mounted so that the cutter moves in a transversely extending cutting plane, means for feeding the bacon slabs along a longitudinally extending path in respect to the cutter, common operating means carried by the frame, means for continuously reciprocating the cutter from and by said common operating means, said feeding means comprising a longitudinally movable frame slidably supported on the main frame, cam mechanism carried by the main frame, means for continuously operating said cam mechanism and by said common operating means, means under the control of said cam mechanism for successively positioning said longitudinally movable frame, during one period in a forward direction relative to the cutter according to a certain number of reciprocative movements of the cutter and during the next period in a reverse direction relative to the cutter for holding in retracted position in respect to the cutter the movable frame and bacon slab thereupon for a certain number of reciprocative movements of the cutter, feeding means carried by but movable relative to said longitudinally movable frame and cooperating by engaging slabs of bacon in the controlling of the feeding and positioning of the bacon in respect to the cutter, and means operated by said common operating means for imparting movement to said feeding means on and in respect to said longitudinally movable frame, said slicing machine having at the delivery end thereof a continuously moving receiving conveyor upon which the slices severed by the slicing machine are delivered to the endless conveyor in a manner whereby spaced groups are formed with the slices in each group arranged in a relatively uniform manner in respect to each other.

2. In a bacon slicing machine a main frame, a cutter, carrying mechanism for said cutter, which carrying mechanism is mounted so that the cutter therefor moves in a transversely extending cutting plane but in a general inclined direction in respect to the surface upon which the slabs of bacon are supported while being sliced so as to thereby effect a drawing cutting action as well as a shearing action during the cutting operation, means for feeding the bacon slabs along a longitudinally extending path in respect to the cutter and for supporting a bacon slab in its successive positions for slicing by the cutter, common operating means carried by the frame, means for continuously operating the cutter carrying mechanism from said common operating means, said feeding means comprising a longitudinally movable frame supported on and longitudinally movable relative to the main frame, cam mechanism carried by the main frame, means for operating said cam mechanism from said common operating means, means under the control of said cam for, during one period, progressively positioning the movable frame in a longitudinal forward direction relative to the cutter and according to a certain number of movements of the cutter and for, during the succeeding period, retracting the movable frame from the cutter according to a certain number of movements of the cutter, auxiliary feeding means carried by said longitudinally movable frame, which auxiliary feeding means is arranged to engage slabs of bacon and to thus cooperate with the movable frame in the controlling of the feeding of the bacon slab to and of the positioning of the bacon slab in respect to the cutter, and means operated by said common operating means for imparting operative movement to said auxiliary feeding means, said machine having at the delivery end thereof a continuously moving receiving conveyor upon which the slices as severed by the cutter are delivered to the endless conveyor in a manner whereby spaced groups of bacon slices are assembled on the conveyor.

3. In a slicing machine, a main frame, a cutter, carrying mechanism for the cutter, which carrying mechanism is mounted on the frame and is operated so that the cutter thereupon moves in a transversely extending cutting plane, means for feeding the bacon slabs along a longitudinally extending path in respect to the cutter, common operating means carried by the frame, means for operating the cutter carrying mechanism from said common operating means, said bacon slab feeding means comprising a movable frame supported on the main frame so that it can move longitudinally in respect to the cutter, mechanism operated from said common operating means for, at one period, positioning the movable frame in a longitudinal direction toward the cutter and for, at a succeeding period, positioning the movable frame from the cutter, an auxiliary feeding means carried by said movable frame, and means operated by said common operating means for imparting movement to said auxiliary feeding means, whereby the latter can effect a feeding action that supplements the feeding action effected as the result of the positioning of the movable frame towards the cutter.

4. In combination a uniformly and longitudinally movable receiving conveyor, and a meat slicing machine having suitable mechanism for operating the hereinafter recited parts in the manner specified; which said slicing machine has a continuously actuated transversely extending cutter normally operated in synchronized relation with respect to said conveyor and adapted to normally successively deliver slices of material as severed thereby to and upon said conveyor and in overlapping relationship in respect to each other, said slicing machine having feeding means operable over and above a longitudinally extending path for feeding slabs of meat to be sliced longitudinally to and under the shearing influence of said cutter, means for imparting successive normal forward longitudinal feeding movements of said feeding means above said longitudinally extending path, each of which normal forward feeding movements thereby imparted to the feeding means is in synchronism with the movements of the cutter and the receiving conveyor, and means including a continuously rotating cam from which there is positively ensured a periodic non-cutting interruption of the normal forward feed of the feeding means between the successive normal forward feeding movement of said feeding means towards said cutter, each of which said periodic interruptions is for sufficient length of time to ensure that a space is left on the receiving conveyor between the last slice delivered thereto preceding the interruption and the first slice delivered thereto following the interruption of the normal forward feed.

5. In combination a uniformly longitudinally movable receiving conveyor, and a meat slicing machine having suitable mechanism for operating the hereinafter recited parts in the manner specified; which said slicing machine has a continuously actuated transversely extending cutter normally operated in synchronized relation with respect to said conveyor and adapted to successively deliver as transversely severed by a shearing action of the cutter slices of material to and upon said conveyor and in overlapping relationship in respect to each other, said slicing machine having feeding means forwardly movable over and along a longitudinally extending path and constructed so as to feed slabs of meat to be sliced longitudinally to and under the shearing influence of said cutter, means for imparting successive periodic normal forward longitudinal feeding movement to said feeding means between each of which normal forward feeding movements there is a non-cutting period during which the normal forward feed is positively interrupted, which normal forward feeding movement thereby imparted to the feeding means is in synchronism with the movements of the cutter and the receiving conveyor, which said feeding means includes a continuous actuated cam from and by which there is functionally controlled means for positively effecting the periodic interrupting of the normal forward feed of said feeding means towards said cutter and for a sufficient length of time to ensure that a space is provided on the receiving conveyor between the last slice delivered thereto preceding the interruption and the first slice delivered thereto following the interrupting with the result that the slices on the receiving conveyor are in grouped arrangement, and means for effecting relative movement in a longitudinal direction and away from each other as between the cutter and the feeding means in order to ensure a longitudinal separation during said non-cutting period of the cutter and the slab of material being sliced.

6. In combination a uniformly longitudinally movable receiving conveyor, and a meat slicing machine having suitable mechanism for operating the hereinafter recited parts in the manner specified; which said slicing machine has a transversely operating cutter normally functioning in synchronized relation with respect to said conveyor and adapted to successively deliver slices of material as severed thereby to and upon said conveyor and in overlapping relationship in respect to each other, said slicing machine having feeding means operable along a longitudinally extending path and providing for feeding slabs of meat to be sliced longitudinally to and under the shearing influence of said cutter during the successive periods of normal cutting operations, means for imparting normal forward longitudinal feeding movement to said feeding means and in such a manner that the normal forward feeding movement thereby imparted to the feeding means is in synchronism with the movements of the cutter and the receiving conveyor, means operatively associated with the cutter and including a continuously rotating cam for effecting periodic non-cutting interrupting of the normal forward feed of said feeding means towards said cutter and thereby the interrupting of the normal cutting operations and for a sufficient length of time to ensure that a space is provided on the receiving conveyor between the last slice delivered thereto preceding the interrupting and the first slice delivered thereto following the interrupting with the result that the slices on the receiving conveyor are in spaced grouped arrangement, and means operatively associated with the cutter for effecting periodic relative movement in a longitudinal direction and away from each other as between the cutter and the feeding means in order to ensure a longitudinal separation of the cutter and the slab of material being sliced during each said non-cutting or interrupting period.

7. In combination a meat slicing machine and a uniformly and longitudinally movable receiving conveyor arranged for receiving in overlapping relationship meat slices periodically delivered thereto as the result of periodic normal cutting operations carried out in and by said slicing machine, which said meat slicing machine comprises a transversely operating cutting element arranged at the forward delivery end of the slicing machine, a constantly actuated cutter operating means for continuously actuating said cutting element in synchronized relation in respect to said conveyor, meat slab positioning and feeding means movable along a longitudinally extending path towards said cutting element for periodically normally feeding slabs of bacon towards and under the cutting influence of said cutting element to effect successive periodic series of normal cutting operations of said slab, continuously actuated feed-operating means functionally associated with said slab positioning and feeding means, which said feed operating means comprehends an intermediate means for imparting from a continuous movable element thereof periodic normal forward feeding movement to the meat slab positioning and feeding means, each of which normal forward feeding movements is in synchronized relationship with respect to said cutter and said receiving conveyor, which said feed operating means also comprehends a control means under the operative influence of a continuous movable cam thereof for ensuring periodic non-cutting interruption for a determined period as to each periodic normal feeding operation, each of which non-cutting periods of interruption is sufficiently long to ensure a spaced grouping of the meat slices as received by and upon said receiving conveyor.

8. In a combination as defined in and by the claim last preceding a slicing machine wherein a constantly actuated operating means as specified in said last preceding claim has means associated therewith and controlled thereby for effecting, during each period of interruption of the normal feed, relatively longitudinal separation as between the cutting element and the slab of meat undergoing successive periodic slicing operations because of the slab being positioned and fed by the positioning and feeding means.

9. In a meat slicing machine including a cutter, drive means for said cutter, an endless feed conveying means movably mounted in relation to said cutter, means for advancing said feed conveying means and the article supported thereon in synchronism with said cutter, cam actuated means for periodically removing said feed conveyor and the supported article from said cutter and means for driving said cam, the drive means for said cam being so synchronized with the drive means for said cutter whereby the cutter will operate to cut a plurality of slices from the article between periodical actuations of the cam.

10. In combination, a slicing machine including a cutter with a slice receiving endless conveying means, drive means for said cutter and means associated with said slicing machine for grouping slices on said slice receiving conveying means comprising a feed conveying means in feeding relation with said cutter, means for advancing said feed conveying means and the article supported thereon in synchronism with said cutter, cam actuated means for periodically removing said feed conveying means and the supported article from said cutter and drive means for said cam, the drive means for the cam being so synchronized with the drive means for the cutter that the cutter will operate to cut a plurality of slices from the article between periodical actuations of the cam by which groups of slices are successively spaced on the slice receiving conveying means.

11. In combination, a slicing machine including a cutter with a slice receiving endless conveying means, drive means for said cutter and means associated with said slicing machine for grouping slices on said slice receiving conveying means comprising a feeding means mounted in feeding relation to said cutter, means for advancing said feeding means and the article supported thereby in synchronism with said cutter, cam actuated means for periodically removing said feeding means and the supported article from said cutter and drive means for said cam, the drive means for the cam being so synchronized with the drive means for the cutter that the cutter will operate to cut a plurality of slices from the article between periodical actuations of the cam by which groups of slices are sucessively spaced on the slice receiving conveying means.

12. In combination, a slicing machine including a cutter with a slice receiving endless conveyor, drive means for said cutter and means associated with said slicing machine for grouping slices on said slice receiving conveyor comprising an endless feed conveyor in feeding relation with said cutter, means for advancing said endless feed conveyor and the article supported thereon in synchronism with said cutter, cam actuated means for periodically removing said feed conveyor and the article supported thereon in synchronism with said cutter, cam actuated means for periodically removing said endless feed conveyor and the supported article from said cutter and drive means for said cam, the drive means for the cam being so synchronized with the drive means for the cutter that the cutter will operate to cut a plurality of slices from the article between periodical actuations of the cam by which groups of slices are successively spaced on the slice receiving conveyor.

13. In combination, a slicing machine including a cutter with a slice receiving endless conveyor, drive means for said cutter and means associated with said slicing machine for grouping slices on said slice receiving conveyor comprising an endless feed conveyor slidably mounted in relation to said cutter, means for advancing said endless feed conveyor and the article supported thereon in synchronism with said cutter, cam actuated means for periodically slidably removing said feed conveyor and the supported article from and to said cutter and drive means for said cam, the drive means for the cam being so synchronized with the drive means for the cutter that the cutter will operate to cut a plurality of slices from the article between periodical actuations of the cam by which groups of slices are successively spaced on the slice receiving conveyor.

CHARLES T. WALTER.